(12) United States Patent
Ward

(10) Patent No.: US 6,371,470 B1
(45) Date of Patent: Apr. 16, 2002

(54) CUTTING BOARD WITH FUNNEL

(75) Inventor: Robert S. Ward, Phoenix, AZ (US)

(73) Assignee: Ronald H. Hodges, Sun Lakes, AZ (US)

( * ) Notice: Subject to any disclaimer, the term of this patent is extended or adjusted under 35 U.S.C. 154(b) by 0 days.

(21) Appl. No.: 09/880,596

(22) Filed: Jun. 13, 2001

(51) Int. Cl.$^7$ ................................................ B23Q 3/00
(52) U.S. Cl. ........................ 269/289 R; 269/13; 269/15; 269/302.01
(58) Field of Search ............................... 269/289 R, 15, 269/13, 901, 909, 302.1

(56) References Cited

U.S. PATENT DOCUMENTS

| | | | | |
|---|---|---|---|---|
| 3,598,164 A | * | 8/1971 | August ......................... | 269/15 |
| 3,926,419 A | * | 12/1975 | Kenny ..................... | 269/289 R |
| 4,041,964 A | * | 8/1977 | Shamoon .................. | 269/302.1 |
| 4,229,858 A | * | 10/1980 | Baxter ......................... | 269/15 |
| 4,243,184 A | * | 1/1981 | Wright .................... | 269/289 R |
| 4,653,737 A | * | 3/1987 | Haskins ................... | 269/289 R |
| 5,092,570 A | * | 3/1992 | Depping ..................... | 269/296 |
| 5,363,755 A | * | 11/1994 | Liang ..................... | 269/289 R |
| 5,386,978 A | * | 2/1995 | Ladwig .................. | 269/289 R |
| 5,580,037 A | * | 12/1996 | Gore ...................... | 269/289 R |
| 5,996,983 A | * | 12/1999 | Laurenzi ................. | 269/289 R |

* cited by examiner

Primary Examiner—Joseph J. Hail, III
Assistant Examiner—Daniel Shanley
(74) Attorney, Agent, or Firm—Frank H. Foster; Kremblas, Foster, Phillips & Pollick

(57) ABSTRACT

A funneled cutting board assembly comprising a cutting board with feet and integral funnel assembly. The cutting board comprises a cutting surface with side rails and an aperture. Extending through the aperture is a funnel. The cutting board may contain an accessory, such as a knife sharpener. The feet of the cutting board are foldable, so in the open position they raise the board for use above a flat surface, and may be closed for use over a sink or to facilitate storage of the board. The funnel assembly of the funneled cutting board may come with various accessories, such as a strainer and different grater inserts.

10 Claims, 3 Drawing Sheets

CUTTING BOARD WITH FUNNEL

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO A "MICROFICHE APPENDIX"

(Not Applicable)

BACKGROUND OF THE INVENTION

1. Field of the Invention

The present invention is in the field of work holders for the comminution of solid food material and their ready transfer to a container. More specifically, the present invention relates to cutting boards for food processing combined with a special receptacle for receiving and guiding the processed food.

2. Description of the Related Art

During food preparation, foodstuffs such as fruits, vegetables, meats and fish are often cut or chopped for use in preparing a meal. Typical cutting boards are a simple planar surface against which foodstuffs are held and a cutting tool (e.g., a butcher knife) is hand driven in a slicing or chopping manner. Although useful as a food holder and surface against which to drive a cutting tool, the simple flat surface of the typical cutting board has certain limitations.

Improvements in such cutting boards to alleviate their limitations or to increase their utility include designs and other features which allow the board to be more easily used over a receptacle, such as a kitchen sink, or to be constructed of materials that are more easily cleaned and less readily support the growth of micro organisms.

Another limitation of a simple flat surfaced cutting board is that the foodstuff can slip or spill off any edge of the board as it is processed. Therefore, it would be beneficial to have a cutting board that is less susceptible to spillage, and has a simple and efficient means for removing the foodstuffs from the cutting board to a container as they are processed.

BRIEF SUMMARY OF THE INVENTION

The invention is a work holder and guide for processing of foodstuffs. The invention has a cutting board, having a generally rectangular configuration. An aperture is formed through the top and bottom surfaces for receiving a funnel. A funnel is removably received into the aperture for receiving processed foodstuff. Preferably, a side rail is attached to at least two of the sides of the cutting board. Also, preferably at least two leg or foot assemblies are mounted to the bottom surface of the cutting board and disposed to support the cutting board above a flat surface.

Figure 1:
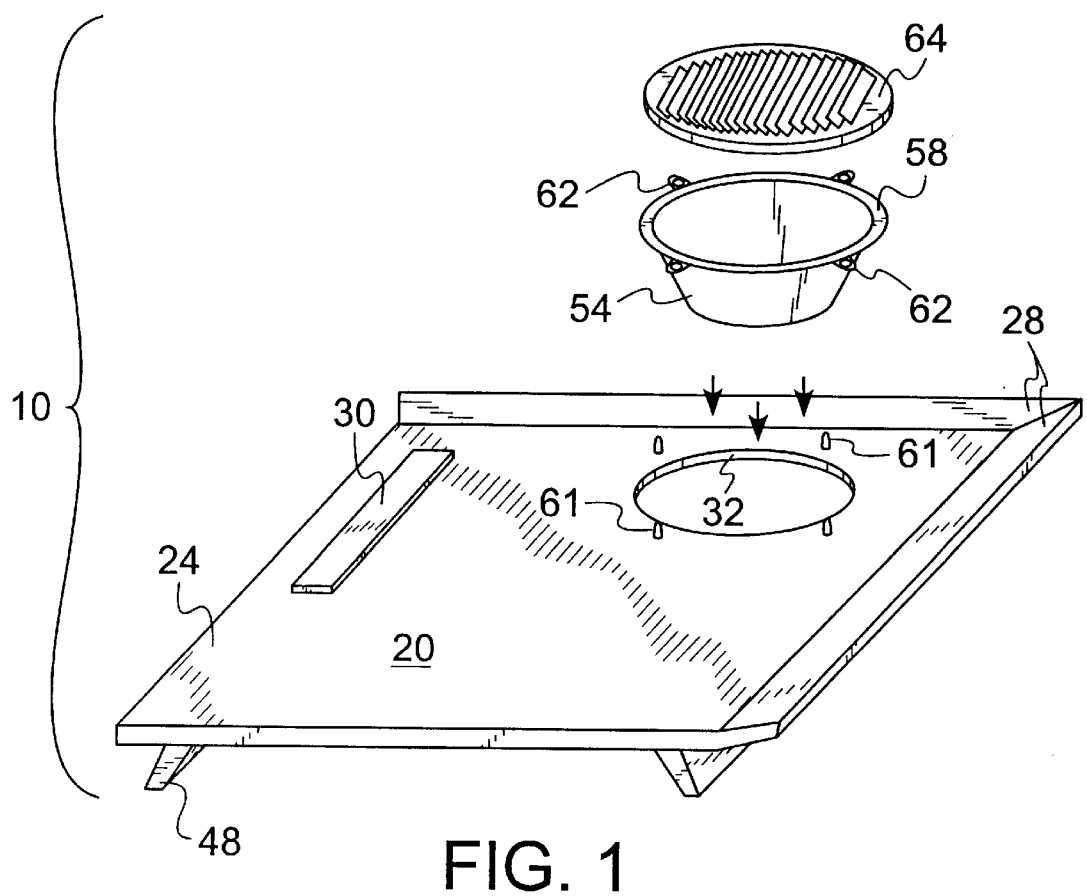
FIG. 1 is a perspective view of the funneled cutting board of the present invention showing the cutting board and the funnel with attachments, and the board supported on legs.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The present invention is a work holder for processing foodstuffs that provides benefits which overcome the problems and limitations of conventional cutting boards. The invention has a funneled cutting board which includes an aperture or opening in the surface of the board into which a funnel is received. Processed foodstuffs may be funneled into a bowl or other container below the device during or after cutting, chopping or other processing of the foodstuffs. This may be easily accomplished by a simple push of the foodstuffs with the knife or other cutting instrument, or with the user's hand.

Various attachments may be combined with the funnel and placed in the aperture, such as strainers and sieves, food graters such as for cheese and the like or even a stopper for preventing the processed foodstuff from passing from the funnel. These attachments may be separate components from the funnel, or they may be integral with the funnel. Further, a solid bowl-like accessory or catch-all may be placed in the aperture. The bowl-like accessory may come with various lid-graters, providing for easy grating, with less loss of material from grating over an open container. The bowl-like accessory may also be made of or include a mesh section, allowing for straining of foodstuffs.

The funneled board of the present invention optionally includes a knife sharpener or other useful item mounted to one side. These items may be permanently fixed to the cutting board or may be removable and interchangeable with each other. Preferably, the funneled board components are made of materials that may be cleaned in a dishwasher, to help make the processing of foodstuffs not only easier, but cleaner as well.

Referring now to the drawings, the details of certain preferred embodiments of the present invention are graphically and schematically illustrated. Like elements in the drawings will be represented by like numbers, and similar elements will be represented by like numbers with a different lower case letter suffix.

Figure 3:
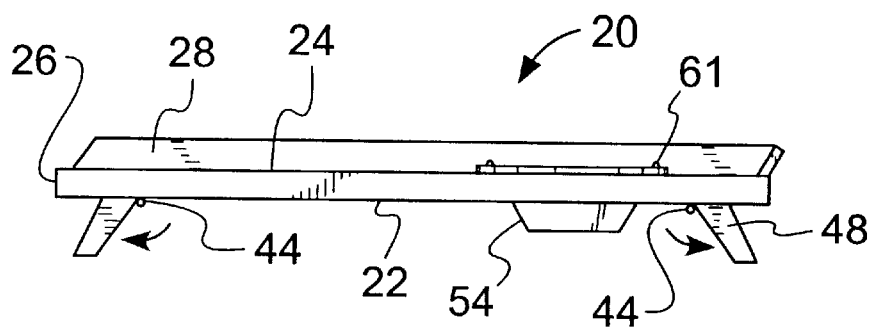
FIG. 3 is a side view of the funneled cutting board showing the cutting board configured with foldable legs that are extended for using the cutting board on a flat surface.
Figure 4:
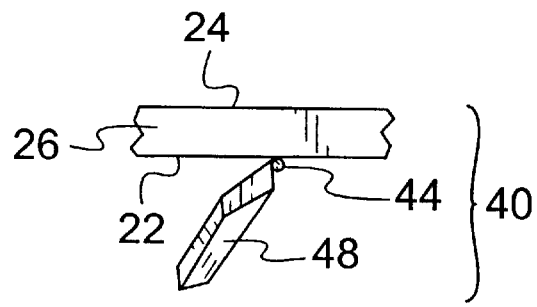
FIG. 4 is a side view of a section of the cutting board showing the collapsible feet or legs and hinge mechanism.

In a preferred embodiment exemplified in FIG. 1, the funneled board assembly 10 is a work holder for processing of foodstuffs comprising a cutting board 20 having a planar and generally rectangular configuration with a top cutting board surface 24, a bottom surface 22 and sides 26 (see FIGS. 3 & 4). The cutting board 20 has an aperture 32 formed through the top 24 and bottom 24 surfaces into which a funnel 54 is received. Foodstuffs (not shown), after having been processed on the top surface 24 of the cutting board 20, are pushed along the top surface 24 into the funnel 54 to remove them from the work area of the cutting board 20. The funnel 54 is removable from the aperture 32.

Side rails 28 are attached to at least two of the sides 26 of the cutting board 20. Legs or feet 48 are mounted to the bottom surface 22 of the cutting board 20 in order to allow the funneled board assembly 10 to be used above a flat surface. The cutting board 20 is made from hard plastic, hardwood or other suitable material that may be easily and safely cleaned using ordinary household cleaners and methods.

Figure 2:
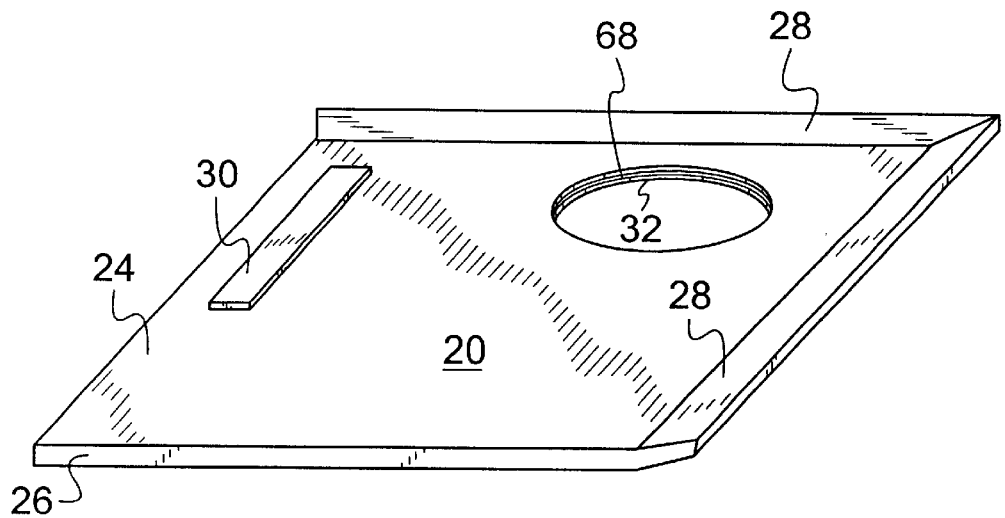
FIG. 2 is a perspective view of the funneled cutting board showing the funnel aperture and knife sharpener, and the board configured with the legs folded out of the way or removed for use over a receptacle, such as a sink.

The aperture 32 passes completely through the surfaces 22 & 24 of the cutting board 20. The aperture 32 preferably is placed nearer a corner of the rear side of the cutting board 20 away from the user. The aperture 32 preferably has a retainer means for releasably holding the funnel 54 in position in the aperture 32 for receiving processed foodstuffs from the top surface of the cutting board. The retainer means may comprise retainer pins 61 protruding from the top surface 24 of the cutting board 20 and disposed to be received into pin tabs 62 on the funnel 54. Alternatively, as shown in FIG. 2, the funnel retainer means may be accomplished by the aperture having a seat 68 for receiving a lip or rim 58 of the funnel 54. Other means for releasably retaining the funnel 54 in the aperture 32 are practicable for use in the present invention and are known to one of ordinary skill in the art.

In a preferred embodiment exemplified in the figures, a side rail 28 is attached to the rear side of the cutting board 20 farthest from the user, and a second side rail 28 is attached to the left or right side of the cutting board 20 whichever is nearer the aperture 32. As shown in the figures, these side rails frame the sides 26 and corner of the cutting board 20 where the aperture 32 is located. Additional side rails 28 may be provided if desired.

In another preferred embodiment of the present device 10, a built-in accessory, such as a knife sharpener 30, is attached to the cutting board 20. Preferably, the accessory is located on the other side of the cutting board 20 from the aperture 32. The knife sharpener 30, is a wet stone as shown in the figures, or a sharpening steel (not shown).

As shown in FIGS. 1, 3 and 4, feet or legs 48 are attached to the bottom surface 22 of the cutting board 20. In the preferred embodiment shown in FIG. 4, foot assemblies 40 are utilized comprising feet 48 and hinges 44. The foot assembly 40 is collapsible for storage of the cutting board member 20 or for using it over a receptacle, such as a sink. Each foot 48 in the assembly 40 is connected to a hinge 44, and the hinge 44 attaches to the bottom surface 22 of the cutting board member 20. In the foot assembly 40, the foot 48 is rotatable around hinge 44 for positioning the foot 48 into an extended or a folded position. A foot 48 (or a foot assembly 40) can extend the width of the cutting board 20 (see FIG. 1) and be placed proximate both sides of the bottom surface 22 of the cutting board 20. Alternatively, a foot 48 or foot assembly 20 can be placed at each corner of the bottom surface 22 of the cutting board 20 (see FIG. 4). Optionally, the foot assembly 40 or individual feet 48 may be made removable and reinstallable.

In order to elevate the cutting board member 20 for use, the feet are opened. The feet 48 open by being pulled down and out, rotating around the hinge 44 into the down position. The feet 48 are closed by rotating the feet 48 up into the closed position. In the closed position, the feet 48 rest next to the bottom surface 22 of the cutting board member 20. The feet 48 may be rotated back into the up position after use of the funnel board 10 for storage.

Alternatively, one small foot may be placed in each corner of the bottom surface 22 of the cutting board 20 (not shown). These feet also open and close as the preferred feet 48.

As shown in FIG. 3, extending down from the bottom surface 22 of the cutting board 20 is the bottom part of the funnel 54. This funnel 54 projection through the bottom surface 22 of the cutting board 20 allows for the processed foodstuff in the aperture 32 to go down an open-ended funnel 54 and drop into a bowl or other container. Alternatively, when cutting or chopping other foodstuffs which have non-edible components, the non-edible portions may be passed through the funnel 54 and into a container for disposal, leaving the useable portion of the foodstuffs separate on the top surface 24 of the cutting board 20.

Figure 5:
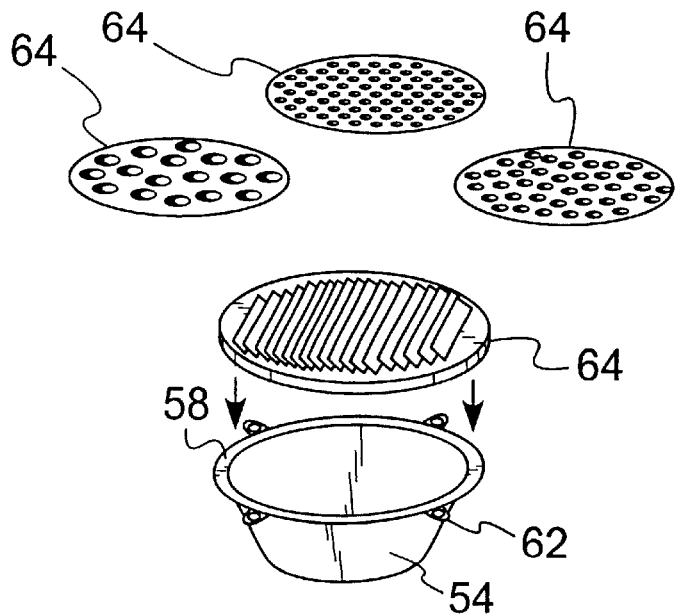
FIG. 5 shows a funnel and various attachments, including strainer or catch-all and various grater tops for use with the funneled cutting boards.
Figure 6:
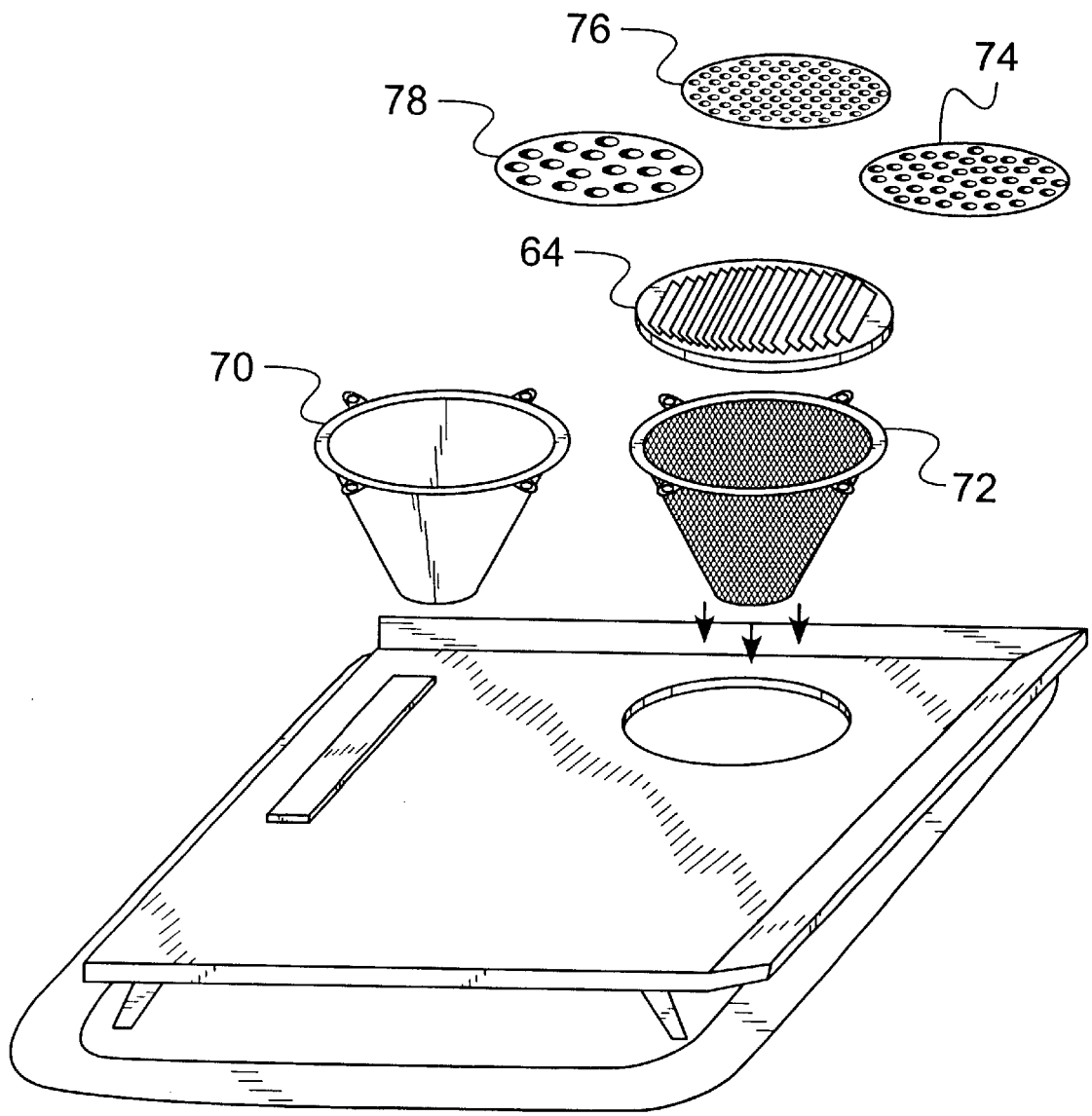
FIG. 6 is an exploded view showing alternative funnels and attachments similar to those illustrated in FIG. 5.

The funnel 54 has a means for removably receiving an accessory insert, such as a strainer, a food grate, a sieve, and a stopper. As shown in FIGS. 1, 5 and 6, the accessories include a catch-all 70, which is an impervious, open top container, a strainer 72, grater 64 and interchangeable sieves 74, 76 and 78. The catch-all 70 and strainer 72 are of a matching size and shape to the open-ended funnel 54 in order to snugly fit into the aperture 32 when inserted. The catch-all 70 and strainer 72 have an upper rim like the upper rim 58 on the funnel 54 to hold and seal the catch-all 70 and strainer 72 once in place. Attached to the upper rim are protruding pin tabs like pin tabs 62 shown in FIGS. 1 and 5. These protruding pin tabs may be used to lift the catch-all 70 and strainer 72 from the aperture after the preparation of the foodstuff is complete.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A work holder for processing of foodstuffs comprising:
   (a) a cutting board, having a generally rectangular configuration with a top cutting board surface, a bottom surface and sides, and an aperture through the top and bottom surfaces for receiving a funnel, the aperture having retainer means for releasably holding a funnel in a position for receiving processed foodstuffs from the top surface of the cutting board, the retainer means for releasably holding the funnel in position comprising retainer pins protruding from the top surface of the cutting board and disposed to be received into pin receivers on the funnel;
   (b) a funnel removably received into the aperture for receiving processed foodstuff;
   (c) a side rail attached to at least two of the sides of the cutting board; and
   (d) at least two leg or foot assemblies mounted to the bottom surface of the cutting board and disposed to support the cutting board above a flat surface.

2. The work holder of claim 1 wherein the retainer means for releasably holding the funnel in position comprises the aperture having a seat for receiving a lip of the funnel.

3. The work holder of claim 1, further comprising a built-in accessory, such as a knife sharpener.

4. The work holder of claim 3, and further comprising the knife sharpener being a wet stone or a sharpening steel.

5. The work holder of claim 1, wherein the foot assembly extends from the front side to the back side of the cutting board on opposite sides of the cutting board.

6. The work holder of claim 5, wherein the feet are rotatable around a hinge, for positioning the feet into an extended or a folded position.

7. The work holder of claim 1, wherein the foot assembly is positioned on the bottom surface of the cutting board at each corner of the cutting board.

8. The work holder of claim 5, wherein the feet are removable and reinstallable.

9. The work holder of claim 1, wherein the funnel has an accessory receptacle for removably receiving an accessory insert.

10. The work holder of claim 9, wherein the accessory insert is selected from the group consisting of a strainer, a food grater, a sieve and a stopper.

* * * * *